United States Patent
Zeng et al.

(10) Patent No.: US 11,545,710 B2
(45) Date of Patent: Jan. 3, 2023

(54) POWER BATTERY BASE AND POWER BATTERY MODULE

(71) Applicant: BYD COMPANY LIMITED, Guangdong (CN)

(72) Inventors: Yi Zeng, Shenzhen (CN); Weixin Zheng, Shenzhen (CN); Jianhua Zhu, Shenzhen (CN); Yan Zhu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 250 days.

(21) Appl. No.: 16/348,419

(22) PCT Filed: Nov. 7, 2017

(86) PCT No.: PCT/CN2017/109800
§ 371 (c)(1),
(2) Date: May 8, 2019

(87) PCT Pub. No.: WO2018/090857
PCT Pub. Date: May 24, 2018

(65) Prior Publication Data
US 2019/0273227 A1    Sep. 5, 2019

(30) Foreign Application Priority Data

Nov. 18, 2016 (CN) .......................... 201611014965.1

(51) Int. Cl.
*H01M 50/20* (2021.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .. H01M 10/613; H01M 50/20; H01M 2/1016; H01M 10/6556; H01M 2/1077;
(Continued)

(56) References Cited

U.S. PATENT DOCUMENTS

2009/0142628 A1* 6/2009 Okada ................. H01M 2/1077
429/8
2009/0301700 A1* 12/2009 German .............. H01M 50/502
165/160

(Continued)

FOREIGN PATENT DOCUMENTS

CN        203659948 U     6/2014
CN        104247142 A    12/2014
(Continued)

OTHER PUBLICATIONS

English Translation of International Search Report from PCT/CN2017/109800 dated Feb. 12, 2018 (2 pages).

*Primary Examiner* — Nicholas P D'Aniello
*Assistant Examiner* — Mary G Henshaw
(74) *Attorney, Agent, or Firm* — Calfee Halter & Griswold LLP

(57) ABSTRACT

A power battery base includes a tray and a liquid cooling tube disposed on the tray, wherein the tray includes a bottom plate and side plates disposed around the periphery of the bottom plate, the bottom plate and the side plates jointly form a receiving cavity for receiving a power battery pack, the bottom plate is provided with at least one beam, the beam divides the bottom plate into at least two sub-bottom plates, the liquid cooling tube is laid on at least one of the sub-bottom plates, and the liquid cooling tube is disposed across the beam that it passes through.

20 Claims, 3 Drawing Sheets

(51) Int. Cl.
  *H01M 10/6567* (2014.01)
  *H01M 10/625* (2014.01)
  *H01M 10/6556* (2014.01)

(52) U.S. Cl.
  CPC ... *H01M 10/6556* (2015.04); *H01M 10/6567* (2015.04); *H01M 2220/20* (2013.01)

(58) Field of Classification Search
  CPC ....... H01M 10/60–667; H01M 10/625; H01M 10/6567; H01M 2220/20
  See application file for complete search history.

(56) References Cited

U.S. PATENT DOCUMENTS

| | | | | |
|---|---|---|---|---|
| 2011/0052960 | A1* | 3/2011 | Kwon | H01M 10/613 429/120 |
| 2011/0206967 | A1* | 8/2011 | Itsuki | H01M 10/6556 429/120 |
| 2012/0183823 | A1* | 7/2012 | Von Borck | H01M 10/653 429/81 |
| 2013/0071707 | A1 | 3/2013 | Koester et al. | |
| 2015/0244036 | A1 | 8/2015 | Lane et al. | |
| 2016/0355100 | A1* | 12/2016 | Ito | H01M 10/625 |
| 2017/0271726 | A1* | 9/2017 | Shen | H01M 10/6554 |
| 2018/0123192 | A1* | 5/2018 | Fees | H01M 10/63 |
| 2019/0267686 | A1* | 8/2019 | Shimizu | H01M 10/6554 |

FOREIGN PATENT DOCUMENTS

| | | | |
|---|---|---|---|
| CN | 205282524 U | 6/2016 | |
| CN | 205452480 U | 8/2016 | |
| CN | 106030231 A | 10/2016 | |
| CN | 206210984 U | 5/2017 | |
| DE | 102010013025 A1 * | 9/2011 | .......... H01M 10/613 |
| DE | 102010013025 A1 | 9/2011 | |
| EP | 2065963 A2 | 6/2009 | |
| EP | 2541669 B1 | 6/2014 | |
| JP | 2009238645 A | 10/2009 | |

* cited by examiner

POWER BATTERY BASE AND POWER BATTERY MODULE

CROSS-REFERENCE TO RELATED APPLICATIONS

This application is the U.S. national phase entry of PCT Application No. PCT/CN2017/109800, filed Nov. 7, 2017, which is based on and claims priority to Chinese Patent Application No. 201611014965.1, filed on Nov. 18, 2016, which are incorporated herein by reference in their entireties.

FIELD

The present invention belongs to the field of electric vehicles, and in particular relates to a power battery base and a power battery module.

BACKGROUND

In an electric vehicle, a power battery base for supporting a power battery pack includes a tray and a liquid cooling tube mounted on the tray. In order to increase the supporting load of the tray, a beam is disposed in the tray, the liquid cooling tube is also laid in the tray, and the beam needs to be provided with a perforation through which the liquid cooling tube passes. Thus, in the assembly process of the power battery base, the liquid cooling tube needs to be assembled to the tray before the beam is mounted on the tray body, which results in the problem that the assembly of the liquid cooling tube is time consuming, that is, the assembly efficiency of the liquid cooling tube is low. When the liquid cooling tube is assembled, it is often the assembly stage of the finished product, which is not conducive to the assembly efficiency of a finished product, and the cost per unit time is high during the assembly stage of the finished product, which is not conducive to reducing the production cost. In addition, when the liquid cooling tube needs to be replaced, based on the above structure, the liquid cooling tube can be taken out after the tray body and the beam are removed, which results in the problem that the disassembly of the liquid cooling tube is time consuming, that is, the disassembly efficiency of the liquid cooling tube is low.

SUMMARY

An object of the present invention is to overcome the above-mentioned deficiencies of the prior art and to provide a power battery base which aims to solve the problem of low efficiency in the assembly and disassembly of a liquid cooling tube.

The present invention is implemented as follows:

A power battery base for supporting a power battery pack includes a tray and a liquid cooling tube disposed on the tray, where the tray includes a bottom plate and side plates disposed around the periphery of the bottom plate, the bottom plate and the side plates jointly form a receiving cavity for receiving the power battery pack, the bottom plate is provided with at least one beam, the beams jointly divide the bottom plate into at least two sub-bottom plates, the liquid cooling tube is laid on at least one of the sub-bottom plates, and the liquid cooling tube is disposed across the beam that it passes through.

According to an exemplary embodiment, the liquid cooling tube includes a liquid inlet tube, a liquid outlet tube, a bonding tube and a connecting tube group for connecting the liquid inlet tube, the liquid outlet tube and the bonding tube, the connecting tube group is disposed across the beam it passes through, and at least two of the sub-bottom plates are provided with the bonding tube.

According to an exemplary embodiment, the connecting tube group includes a first connecting tube connecting the liquid inlet tube and the bonding tube, a second connecting tube connecting the two bonding tubes, and a third connecting tube connecting the liquid outlet tube and the bonding tube, the first connecting tube, the second connecting tube and the third connecting tube are all disposed across the beam they pass through, and the number of the second connecting tube is at least one.

According to an exemplary embodiment, the first connecting tube, the second connecting tube and the third connecting tube are attached to the inner side wall of the side plate.

According to an exemplary embodiment, the heights of the first connecting tube, the second connecting tube and the third connecting tube are respectively less than the height of the side plates.

According to an exemplary embodiment, the liquid inlet tube, the liquid outlet tube, the bonding tube, the first connecting tube, the second connecting tube and the third connecting tube are integrally provided.

According to an exemplary embodiment, the connecting tube group includes two collecting tubes, one collecting tube is communicated with the liquid inlet tube, the other collecting tube is communicated with the liquid outlet tube, the two collecting tubes are disposed across the respective beam they pass through, and two ends of at least two of the bonding tubes are respectively communicated with the two collecting tubes.

According to an exemplary embodiment, the connecting tube group further includes a fourth connecting tube for connecting the two bonding tubes, the fourth connecting tube is disposed across the beam that it passes through, and the number of the fourth connecting tube is at least one.

According to an exemplary embodiment, the tray further includes two oppositely disposed side plates, and one collecting tube is closely attached to the inner wall surface of one side plate, the other collecting tube is closely attached to the inner wall surface of the other side plate.

According to an exemplary embodiment, the arrangement path of the bonding tube is in a meandering manner.

According to an exemplary embodiment, the liquid inlet tube is attached to the inner side wall of the side plate or extends along the inner side wall of the side plate and out of the receiving cavity;

and/or the liquid outlet tube is attached to the inner side wall of the side plate or extends along the inner side wall of the side plate and out of the receiving cavity.

According to an exemplary embodiment, the bonding tube is arranged as a flat tube.

According to an exemplary embodiment, the beam and the bottom plate are integrally provided.

The present invention further provides a power battery module, including the above power battery base.

According to the structure of the present invention, by disposing the liquid cooling tube across the beam that it passes through, when the power battery base is assembled, the beam is firstly fixed to the tray, and then the liquid cooling tube is directly placed on the tray, so that it is not necessary to assemble the liquid cooling tube on the tray before the beam is mounted on the tray, thereby improving the assembly efficiency of assembling the liquid cooling tube on the tray, and especially being beneficial to the assembly efficiency in the assembly stage of a finished product. When the liquid cooling tube is disassembled, since the liquid cooling tube is also disposed across the beam that it passes through and the beam does not interfere with the removal of the liquid cooling tube from the tray, the liquid cooling tube can be directly disassembled from the tray and it is not necessary to disassemble the liquid cooling tube after the beam is disassembled from the tray, which is beneficial to improving the disassembly efficiency of the liquid cooling tube. If the maintenance occurs later, the liquid cooling tube can be directly disassembled from the tray, which is beneficial to improving the maintenance efficiency.

In addition, according to the structure of the present invention, the beam does not need to be provided with a perforation through which the liquid cooling tube passes, thereby avoiding the decrease of the mechanical strength of the beam due to the perforation, and being beneficial to increasing the supporting load of the power battery base.

In addition, since the liquid cooling tube is disposed across the beam that it passes through, the overall liquid cooling tube is arranged in a three-dimensional manner, so that the contact points of the liquid cooling tube and the power battery pack are also arranged in a three-dimensional manner instead of only in one plane, thereby reducing the heat conduction distance of part of the heat energy and improving the heat dissipation efficiency of the liquid cooling tube.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF REFERENCE NUMERALS

| Numeral | Name | Numeral | Name |
|---|---|---|---|
| 100 | Tray | | |
| 110 | Bottom plate | 111 | Sub-bottom plate |
| 120 | Side plate | | |
| 200 | Liquid cooling tube | | |
| 211 | Liquid inlet tube | 212 | Liquid outlet tube |
| 213 | Bonding tube | | |
| 214 | Connecting tube group | | |
| 2141 | First connecting tube | 2142 | Second connecting tube |
| 2143 | Third connecting tube | 2144 | Collecting tube |
| 300 | Beam | | |

DETAILED DESCRIPTION

The following describes in detail embodiments of the present invention. Examples of the embodiments are shown in the accompanying drawings, where reference signs that are the same or similar from beginning to end represent same or similar components or components that have same or similar functions. The embodiments described below with reference to the accompanying drawings are exemplary, aim to explain the disclosure, but cannot be understood as a limitation on the disclosure.

Embodiment I

The embodiment of the present invention provides a power battery base for supporting a power battery pack.

Figure 1:
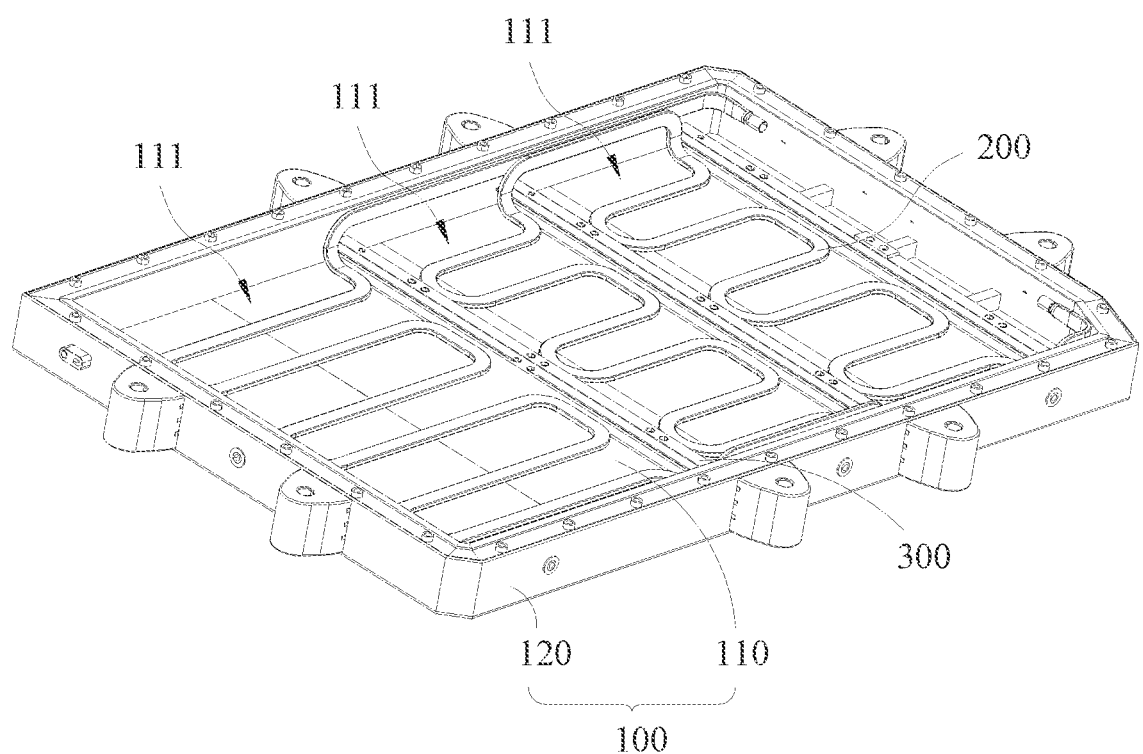
FIG. 1 is an overall structure schematic view of a power battery base according to embodiment I of the present invention.
Figure 2:
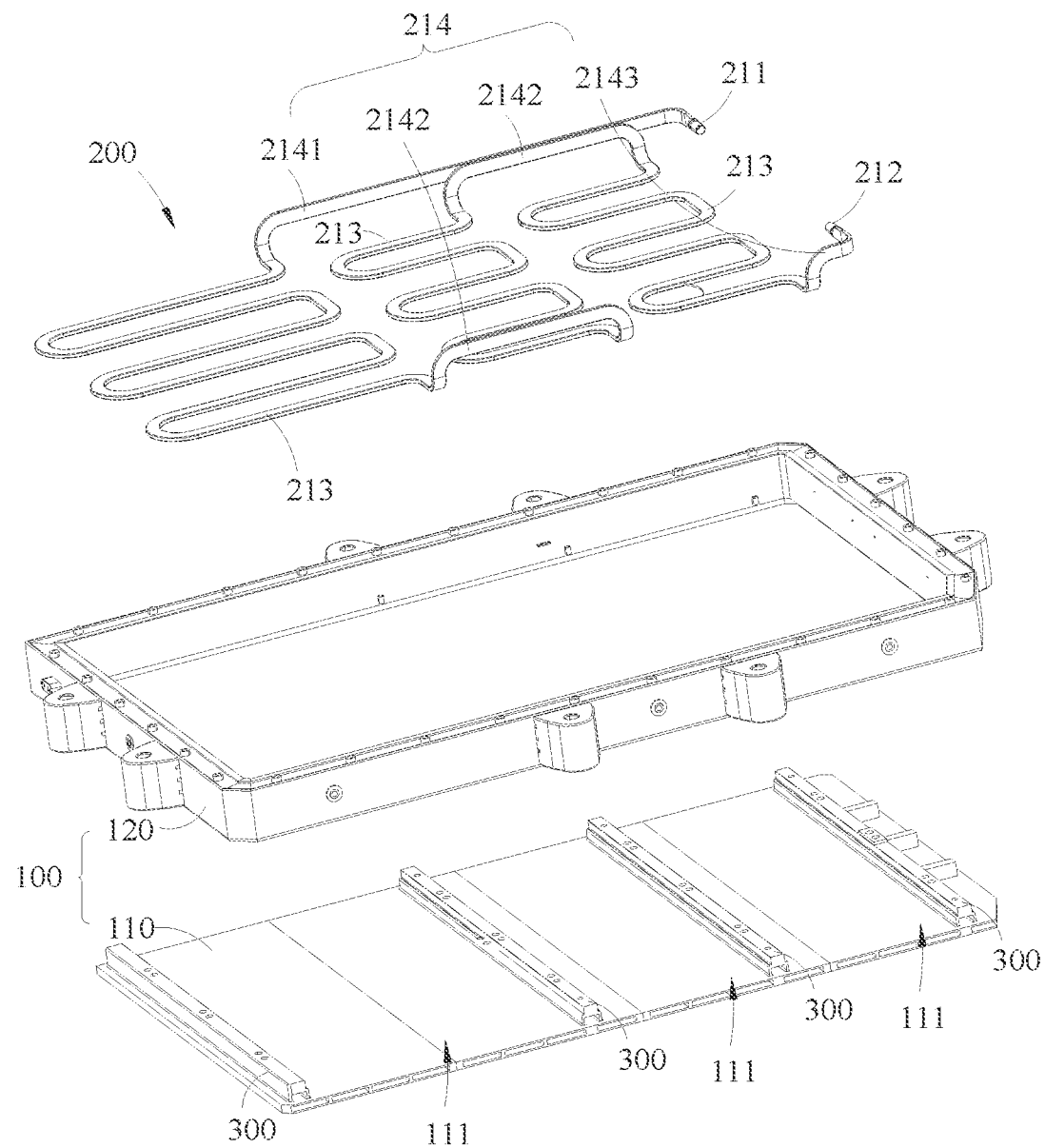
FIG. 2 is an overall exploded view of the power battery base according to embodiment I of the present invention.

As shown in FIG. 1 and FIG. 2, the power battery base includes a tray 100 and a liquid cooling tube 200 disposed on the tray 100. The liquid cooling tube 200 may be made of a material having a high thermal conductivity, such as metallic copper, metallic silver, or the like. The tray 100 includes a bottom plate 110 and side plates 120 disposed around the periphery of the bottom plate 110, the bottom plate 110 and the side plates 120 jointly form a receiving cavity (not shown) for receiving the power battery pack, and the bottom plate 110 is provided with at least one beam 300, where it is preferable to provide one beam 300 in the cross direction. The beams 300 jointly divide the bottom plate 110 into at least two sub-bottom plates 111, the liquid cooling tube 200 is laid on at least one of the sub-bottom plates 111, and the liquid cooling tube 200 is disposed across the beam 300 that it passes through, that is, the liquid cooling tube 200 is disposed on the outer surface of the beam 300. More specifically, the liquid cooling tube 200 is laid in one sub-bottom plate 111 and extends from the sub-bottom plate 111 to the side plate 120 or into the other sub-bottom plate 111. During the extension, the liquid cooling tube 200 extends across the beam 300 between the two sub-bottom plates 111 into another sub-bottom plate 111, or extends across the beam 300 between the sub-bottom plate 111 and the side plate 120 to the liquid outlet tube or liquid inlet tube along the side plate 120. In the present embodiment, the number of the beam 300 is four, and the four beams 300 divide the bottom plate 110 into three sub-bottom plates 111, where the two beams 300 are respectively disposed adjacent to the inner side wall of the side plate 120.

In the present invention, "disposed across" includes that the liquid cooling tube is across the beam 300 from the middle (may even be fixed to the beam 300) or across from the end, near the side plate 120, of the beam 300 (at this time, the portion of the liquid cooling tube across the beam 300 may be fixed to the beam 300 or may be fixed to the side plate 120). Of course, the following condition is also included: the liquid cooling tube directly extends from the sub-bottom plate to the side plate 120, and continues to extend along the side plate 120 to the other sub-bottom plate or to the liquid inlet tube or the liquid outlet tube. At this time, the portion of the liquid cooling tube higher than the beam 300 extends to other positions, which is regarded to be "disposed across" the beam 300.

According to the structure of the present invention, by disposing the liquid cooling tube 200 across the beam 300 that it passes through, when the power battery base is assembled, the beam 300 is firstly fixed to the tray 100, and then the liquid cooling tube 200 is directly placed on the tray 100, so that it is not necessary to assemble the liquid cooling tube 200 to the tray 100 before the beam 300 is disposed on the tray 100, thereby improving the assembly efficiency of assembling the liquid cooling tube 200 on the tray 100, and especially being beneficial to the assembly efficiency in the assembly stage of a finished product. When the liquid cooling tube 200 is disassembled, since the liquid cooling tube 200 is also disposed across the beam 300 that it passes through and the beam 300 does not interfere with the removal of the liquid cooling tube 200 from the tray 100, the liquid cooling tube 200 can be directly disassembled from the tray 100 and it is not necessary to disassemble the liquid cooling tube 200 after the beam 300 is disassembled from the tray 100, which is beneficial to improving the disassembly efficiency of the liquid cooling tube 200. If the maintenance occurs later, the liquid cooling tube 200 can be directly disassembled from the tray 100, which is beneficial to improving the maintenance efficiency.

In addition, according to the structure of the present invention, the beam 300 does not need to be provided with a perforation through which the liquid cooling tube 200 passes, thereby avoiding the decrease of the mechanical strength of the beam 300 due to the perforation, and being beneficial to increasing the supporting load of the power battery base. The overall toughness of the beam 300 is improved, thereby improving the overall toughness of the tray 100 and ensuring the use safety of the tray 100.

In addition, since the liquid cooling tube 200 is disposed across the beam 300 that it passes through, the overall liquid cooling tube 200 is arranged in a three-dimensional manner, so that the contact points of the liquid cooling tube 200 and the power battery pack are also arranged in a three-dimensional manner instead of only in one plane, thereby reducing the heat conduction distance of part of the heat energy and improving the heat dissipation efficiency of the liquid cooling tube 200.

As shown in FIG. 1 and FIG. 2, the liquid cooling tube 200 includes a liquid inlet tube 211, a liquid outlet tube 212, a bonding tube 213, and a connecting tube group 214 for connecting the liquid inlet tube 211, the liquid outlet tube 212 and the bonding tube 213, the connecting tube group 214 is disposed across the beam 300 that it passes through, and at least two sub-bottom plates 111 are provided with the bonding tube 213. The connecting tube group 214 protrudes from the plane formed by the bonding tube 213, so that the liquid cooling tube 200 is arranged in a three-dimensional manner, and the heat adjacent to the connecting tube group 214 is absorbed by the connecting tube group 214, which is beneficial to improving the heat dissipation efficiency of the liquid cooling tube 200. In some embodiments, the bonding tube 213 in one of the sub-bottom plates 111 extends across the beam 300 into the other sub-bottom plate 111 to be communicated with the bonding tube 213 in the other sub-bottom plate 111; alternatively, the bonding tube 213 in the sub-bottom plate 111 extends across the beam 300 to the side plate 120 and extends along the side plate 120 to the liquid outlet tube 212 or the liquid inlet tube 211.

Specifically, in the present embodiment, as shown in FIG. 1 and FIG. 2, the connecting tube group 214 includes a first connecting tube 2141 connecting the liquid inlet tube 211 and the bonding tube 213, a second connecting tube 2142 connecting the two bonding tubes 213, and a third connecting tube 2143 connecting the liquid outlet tube 212 and the bonding tube 213, and the first connecting tube 2141, the second connecting tube 2142 and the third connecting tube 2143 are all disposed across the beam 300 that they pass through. In this way, the bonding tubes 213 are arranged in series, and a medium enters a one-way flow, which is beneficial to increasing the flow speed of the medium, thereby improving the heat dissipation efficiency. The first connecting tube 2141, the second connecting tube 2142 and the third connecting tube 2143 protrude from the plane formed by the bonding tube 213, so that the liquid cooling tube 200 is arranged in a three-dimensional manner, and the heat adjacent to the first connecting tube 2141, the second connecting tube 2142 and the third connecting tube 2143 is respectively absorbed by the first connecting tube 2141, the second connecting tube 2142 and the third connecting tube 2143, thereby improving the heat dissipation efficiency of the liquid cooling tube 200.

In the above specific embodiment, the first connecting tube 2141 and the third connecting tube 2143 are the connecting portions of the bonding tube 213 in the sub-bottom plate 111, and the connecting portions extend across the beam 300 to the side plate 120, that is, the portions extend across the beam 300; and the second connecting tube 2142 is a connecting portion of the bonding tube 213 in one sub-bottom plate 111, and the connecting portion extends across the beam 300 to the bonding tube 213 in the other sub-bottom plate 111, that is, the portion extends across the beam 300, and is used for connecting the bonding tubes 213 in the two adjacent sub-bottom plates 111.

Further, the liquid inlet tube 211 is attached to the inner side wall of the side plate 120, the liquid outlet tube 212 is attached to the inner side wall of the side plate 120, and the first connecting tube 2141, the second connecting tube 2142 and the third connecting tube 2143 are attached to the inner side wall of the side plate 120. If the liquid inlet tube 211, the liquid outlet tube 212, the first connecting tube 2141, the second connecting tube 2142 and the third connecting tube 2143 are all arranged in the receiving cavity, then the arrangement condition of the liquid inlet tube 211, the liquid outlet tube 212, the first connecting tube 2141, the second connecting tube 2142 and the third connecting tube 2143 will affect the mounting position of the power battery pack; by attaching the liquid inlet tube 211, the liquid outlet tube 212, the first connecting tube 2141, the second connecting tube 2142 and the third connecting tube 2143 to the inner side wall of the side plate 120, i.e., by disposing the liquid inlet tube 211, the liquid outlet tube 212, the first connecting tube 2141, the second connecting tube 2142 and the third connecting tube 2143 all in the wall of the receiving cavity, compared with the case of disposing the liquid inlet tube 211, the liquid outlet tube 212, the first connecting tube 2141, the second connecting tube 2142 and the third connecting tube 2143 on the bottom of the receiving cavity, the power battery pack can be closer to the bonding tube 213; and since the bonding tube 213 serves as a main heat-dissipating tube, the closer the power battery pack is to the bonding tube 213, the better the heat dissipation efficiency is improved. In addition, in other embodiments, if the second connecting tube 2142 is present at the same side plate 120 as the first connecting tube 2141 or the third connecting tube 2143, the second connecting tube 2142 can be attached to the outer wall surface, facing the receiving cavity, of the first connecting tube 2141 or the third connecting tube 2143.

In other embodiments, the liquid inlet tube 211 may extend along the inner side wall of the side plate 120 and out of the receiving cavity, and the liquid outlet tube 212 may also extend along the inner side wall of the side plate 120 and out of the receiving cavity, so that the liquid cooling tube 200 and the external connection structure are arranged outside the cavity, thereby simplifying the connection structure of the power battery base in the receiving cavity.

Further, the heights of the first connecting tube 2141, the second connecting tube 2142 and the third connecting tube 2143 are respectively less than the height of the side plates 120, so that the first connecting tube 2141, the second connecting tube 2142 and the third connecting tube 2143 can be prevented from abutting against the bottom of a vehicle, thereby hampering the situation that the power battery base is assembled on the bottom of the electric vehicle.

Further, the arrangement path of the bonding tube 213 is in a meandering manner. Based on this, by the meandering arrangement of the bonding tube 213, the contact surface between the liquid cooling tube 200 and the bottom surface of the power battery pack can be increased, the heat exchange area between the liquid cooling tube 200 and the bottom surface of the power battery pack can be increased, and the heat exchange efficiency between the liquid cooling tube 200 and the power battery pack can be improved, thereby improving the heat dissipation efficiency of the liquid cooling tube 200. As for how the arrangement path of the bonding tube 213 is set in a meandering manner, the bonding tube can be arranged according to the shape of an actual product and the main heat dissipation point of the power battery pack, such as M shape, U shape, S shape.

Further, the liquid inlet tube 211, the liquid outlet tube 212, the bonding tube 213, the first connecting tube 2141, the second connecting tube 2142 and the third connecting tube 2143 are integrally provided. Thus, by the integral arrangement, the soldering joints or connection points drawn from the liquid cooling tube 200 can be reduced, which is advantageous for improving the structural stability, safety and durability of the liquid cooling tube 200.

Further, the liquid inlet tube 211, the liquid outlet tube 212, the bonding tube 213, the first connecting tube 2141, the second connecting tube 2142 and the third connecting tube 2143 are respectively arranged as a flat tube. Based on this, the liquid inlet tube 211, the liquid outlet tube 212, the bonding tube 213, the first connecting tube 2141, the second connecting tube 2142 and the third connecting tube 2143 can be attached to the bottom plate 110 and the side plate 120 through a flat and straight surface. In this way, on the one hand, in the case of ensuring the same flow rate of the liquid cooling tube 200, it is advantageous for saving space. On the other hand, the liquid inlet tube 211, the liquid outlet tube 212, the bonding tube 213, the first connecting tube 2141, the second connecting tube 2142 and the third connecting tube 2143 can be in contact with the power battery pack through another flat and straight surface, which is beneficial to increasing the contact area between the liquid cooling tube 200 and the power battery pack, thereby improving the heat exchange efficiency between the liquid cooling tube 200 and the power battery pack, and further improving the heat dissipation efficiency of the liquid cooling tube 200.

As shown in FIG. 2, the beam 300 and the bottom plate 110 are integrally provided. Based on this, the beam 300 and the bottom plate 110 are integrally formed in the production process, so that the assembly step of the beam 300 and the bottom plate 110 are removed, which is advantageous for improving the assembly efficiency. In addition, the beam 300 and the bottom plate 110 are integrally provided, which is also advantageous for increasing the load carrying capacity of the tray 100.

Embodiment II

Figure 3:
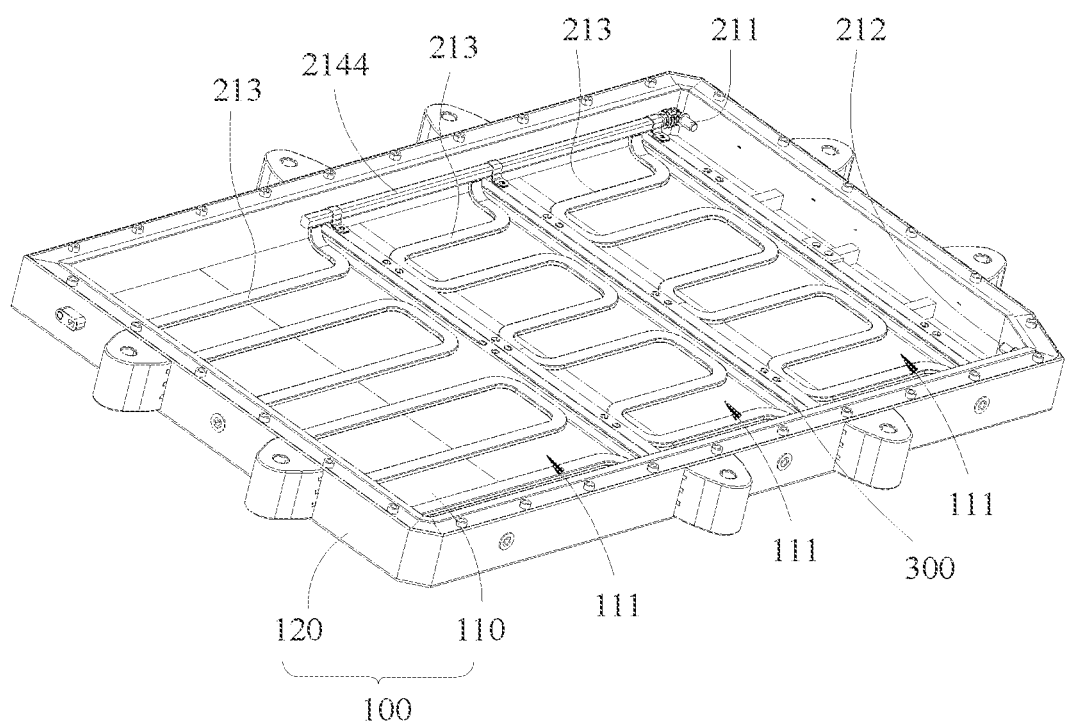
FIG. 3 is an overall structure schematic view of a power battery base according to embodiment II of the present invention.

As shown in FIG. 3, the difference between embodiment II and embodiment I is the connecting tube group 214. Specifically, the connecting tube group 214 includes two collecting tubes 2144, where one collecting tube 2144 is communicated with the liquid inlet tube 211, the other collecting tube 2144 is communicated with the liquid outlet tube 212, the two collecting tubes 2144 are disposed across the respective beam 300 that they pass through, and two ends of at least two bonding tubes 213 are respectively communicated with the two collecting tubes 2144. Specifically, one end of the bonding tube 213 is communicated with one collecting tube 2144, and the other end is communicated with the other collecting tube 2144; at the same time, the number of the above bonding tube 213 is at least two, so that the at least two bonding tubes 213 are arranged in parallel, and when the medium enters the parallelly disposed bonding tubes 213 via one collecting tube 2144, the medium has substantially the same temperature, which is advantageous for balancing the heat absorption capability of the parallelly disposed bonding tubes 213. The two collecting tubes 2144 protrude from the plane formed by the bonding tubes 213, so that the liquid cooling tube 200 is arranged in a three-dimensional manner, and part of the heat adjacent to the collecting tubes 2144 is absorbed by the collecting tubes 2144, which is beneficial to improving the heat dissipation efficiency of the liquid cooling tube 200. Specifically, in the present embodiment, each bonding tube 213 is respectively laid on one sub-bottom plate 111, one orifice of each bonding tube 213 is in communication with one collecting tube 2144, and the other orifice is in communication with the other collecting tube 2144.

Further, the tray includes two oppositely disposed side plates 120, and in the two oppositely disposed side plates 120, one collecting tube 2144 is closely attached to the inner wall surface of one side plate 120, the other collecting tube 2144 is closely attached to the inner wall surface of the other side plate 120. By attaching the liquid inlet tube 211, the liquid outlet tube 212 and the two collecting tubes 2144 to the inner side wall of the side plate 120, i.e., by arranging the liquid inlet tube 211, the liquid outlet tube 212 and the two collecting tubes 2144 all in the wall of the receiving cavity, compared with the case of disposing the liquid inlet tube 211, the liquid outlet tube 212 and the two collecting tubes 2144 on the bottom of the receiving cavity, the overall power battery pack can be closer to the bonding tube 213; and since the bonding tube 213 serves as the main heat-dissipating tube, the closer the power battery pack is to the bonding tube 213, the better the heat dissipation efficiency is improved.

Further, the bonding tube 213 is arranged as a flat tube. Based on this, the bonding tubes 213 all pass through the flat-and-straight surface bottom plate 110. On the one hand, in the case of ensuring the same flow rate of the liquid cooling tube 200, it is advantageous for saving space. On the other hand, the other flat and straight surface of the bonding tube is in contact with the power battery pack, which is beneficial to increasing the contact area between the liquid cooling tube 200 and the power battery pack, thereby improving the heat exchange efficiency between the liquid cooling tube 200 and the power battery pack, and further improving the heat dissipation efficiency of the liquid cooling tube 200.

Embodiment III

The difference between embodiment III and embodiment II lies in the connecting tube group. The connecting tube group further includes a fourth connecting tube for connecting the two bonding tubes, the fourth connecting tube is disposed across the beam that it passes through, the number of the fourth connecting tube is at least one, that is, the at least two bonding tubes are connected to the collecting tube after being connected in series instead of being directly connected to the two collecting tubes. Based on this structure, the liquid cooling tube has the bonding tubes disposed in series, and also has the bonding tubes disposed in parallel. Therefore, it is advantageous for comprehensively utilizing the advantages of the series arrangement and the parallel arrangement of the bonding tubes, and the arrangement can be performed according to the specific heat dissipation requirements.

Embodiment IV

The present invention further provides a power battery module. The power battery module includes a power battery base. As for the specific structure of the power battery base, references are made to embodiments I, II and II described above. Since all the technical solutions of embodiments I, II and II described above are used in the present power battery module, the present power battery module also has all the beneficial effects brought by the technical solutions of embodiments I, II and II, and will not be further described herein.

The foregoing descriptions are merely exemplary embodiments of the present invention, but are not intended to limit the present invention. Any modifications, equivalent substitutions, and improvements made within the spirit and principle of the present invention shall fall within the protection scope of the present invention.

What is claimed is:

1. A power battery base for supporting a power battery pack, comprising a tray and a liquid cooling tube disposed on the tray, wherein the tray comprises a bottom plate and side plates disposed around a periphery of the bottom plate, the bottom plate and the side plates jointly form a receiving cavity for receiving the power battery pack, the bottom plate is provided with at least two beams, the beams divide the bottom plate into at least three planar sub-bottom plates, the liquid cooling tube is laid on at least one of the sub-bottom plates, and the liquid cooling tube is disposed across the beams, wherein portions of the cooling tube across the beams are higher than portions of the cooling tube laid on at least one of the sub-bottom plates, wherein at least a portion of the liquid cooling tube on one of the sub-bottom plates and between the beams runs parallel to the beams, and wherein each side plate has an inner side wall.

2. The power battery base according to claim 1, wherein the liquid cooling tube comprises a liquid inlet tube, a liquid outlet tube, a bonding tube, and a connecting tube group for connecting the liquid inlet tube, the liquid outlet tube, and the bonding tube, the connecting tube group is disposed across one of the beams, and at least three of the sub-bottom plates are provided with the bonding tube.

3. The power battery base according to claim 2, wherein the connecting tube group comprises a first connecting tube for connecting the liquid inlet tube and the bonding tube, a second connecting tube for connecting two adjacent portions of the bonding tube, and a third connecting tube for connecting the liquid outlet tube and the bonding tube, the first connecting tube, the second connecting tube, and the third connecting tube are each disposed across one of the beams, and the number of the second connecting tube is at least one.

4. The power battery base according to claim 3, wherein the first connecting tube, the second connecting tube, and the third connecting tube are attached to the inner side wall of one of the side plates.

5. The power battery base according to claim 4, wherein an arrangement path of the bonding tube is in a meandering manner in a plane parallel to the bottom plate.

6. The power battery base according to claim 4, wherein the liquid inlet tube is attached to the inner side wall of one of the side plates or extends along the inner side wall of one of the side plates and out of the receiving cavity; and
the liquid outlet tube is attached to the inner side wall of one of the side plates or extends along the inner side wall of one of the side plates and out of the receiving cavity.

7. The power battery base according to claim 3, wherein the heights of the first connecting tube, the heights of the second connecting tube, and the heights of the third connecting tube are respectively less than a height of the side plates.

8. The power battery base according to claim 7, wherein the liquid inlet tube is attached to the inner side wall of one of the side plates or extends along the inner side wall of one of the side plates and out of the receiving cavity; and
the liquid outlet tube is attached to the inner side wall of one of the side plates or extends along the inner side wall of one of the side plates and out of the receiving cavity.

9. The power battery base according to claim 3, wherein the liquid inlet tube, the liquid outlet tube, the bonding tube, the first connecting tube, the second connecting tube, and the third connecting tube are integrally provided.

10. The power battery base according to claim 3, wherein an arrangement path of the bonding tube is in a meandering manner in a plane parallel to the bottom plate.

11. The power battery base according to claim 3, wherein the liquid inlet tube is attached to the inner side wall of one of the side plates or extends along the inner side wall of one of the side plates and out of the receiving cavity; and
the liquid outlet tube is attached to the inner side wall of one of the side plates or extends along the inner side wall of one of the side plates and out of the receiving cavity.

12. The power battery base according to claim 2, wherein the connecting tube group comprises two collecting tubes, one collecting tube is communicated with the liquid inlet tube, the other collecting tube is communicated with the liquid outlet tube, the two collecting tubes are disposed across one of the beams, and two ends of at least two of the bonding tubes are respectively communicated with the two collecting tubes.

13. The power battery base according to claim 12, wherein the connecting tube group further comprises a fourth connecting tube for connecting the two bonding tubes, the fourth connecting tube is disposed across one of the beams, and the number of the fourth connecting tube is at least one.

14. The power battery base according to claim 12, wherein two of the side plates are oppositely disposed, and one collecting tube is attached to the inner wall surface of one of the oppositely disposed side plates, the other collecting tube is attached to the inner wall surface of the other oppositely disposed side plate.

15. The power battery base according to claim 2, wherein an arrangement path of the bonding tube is in a meandering manner in a plane parallel to the bottom plate.

16. The power battery base according to claim 2, wherein the liquid inlet tube is attached to the inner side wall of one of the side plates or extends along the inner side wall of one of the side plates and out of the receiving cavity;
or the liquid outlet tube is attached to the inner side wall of one of the side plates or extends along the inner side wall of one of the side plates and out of the receiving cavity.

17. The power battery base according to claim 2, wherein the bonding tube is arranged as a flat tube.

18. The power battery base according to claim 2, wherein the liquid inlet tube is attached to the inner side wall of one of the side plates or extends along the inner side wall of one of the side plates and out of the receiving cavity; and the liquid outlet tube is attached to the inner side wall of one of the side plates or extends along the inner side wall of one of the side plates and out of the receiving cavity.

19. The power battery base according to claim 1, wherein the beams and the bottom plate are integrally provided.

20. A power battery module, comprising the power battery base according to claim 1.

* * * * *